United States Patent

Pezzlo et al.

Patent Number: 6,049,561
Date of Patent: Apr. 11, 2000

[54] RADIO FREQUENCY COMMUNICATION SYSTEM

[75] Inventors: John Pezzlo, Framingham; C. Leonard Bennett, Groton; Harry L. Shaffer, Lynnfield, all of Mass.

[73] Assignee: Raytheon Company, Lexington, Mass.

[21] Appl. No.: 08/848,846

[22] Filed: Apr. 30, 1997

[51] Int. Cl.$^7$ .................................................. H04B 1/713
[52] U.S. Cl. .......................................................... 375/132
[58] Field of Search ................................ 375/202, 200, 375/205, 201, 132; 370/375

[56] References Cited

U.S. PATENT DOCUMENTS

| | | | |
|---|---|---|---|
| 4,641,339 | 2/1987 | Stottlemeyer | 379/391 |
| 4,850,036 | 7/1989 | Smith | 455/179 |
| 4,998,290 | 3/1991 | Olenick et al. | 455/53 |
| 5,130,987 | 7/1992 | Flammer | 370/103 |
| 5,274,666 | 12/1993 | Dowdell et al. | 375/1 |
| 5,442,660 | 8/1995 | Kuo et al. | 375/202 |
| 5,459,759 | 10/1995 | Schilling | 375/202 |
| 5,546,422 | 8/1996 | Yokev et al. | 375/202 |
| 5,596,330 | 1/1997 | Yokev et al. | 342/387 |
| 5,638,399 | 6/1997 | Schuchman et al. | 375/202 |
| 5,737,358 | 4/1998 | Ritz et al. | 375/202 |

FOREIGN PATENT DOCUMENTS 0 719 003 A2   6/1996   European Pat. Off. ........ H04L 05/06

OTHER PUBLICATIONS

PCT Search Report dated Oct. 26, 19982.
"Universal Modem system (UMS) Medium Data Rate (MDR) Orthogonal Frequency Hopped Multiple Access (OFHMA)", S&TCD, CECOM, Final Report, Aug. 31, 1995.

Primary Examiner—Stephen Chin
Assistant Examiner—Mohammad Ghayour
Attorney, Agent, or Firm—Fish & Richardson P.C.

[57] ABSTRACT

A spread spectrum radio frequency communication system comprising a plurality of transmitters adapted to operate at different carrier frequencies having a preassigned frequency separation, such carrier frequencies randomly changing in accordance with a common pseudo-random code. Each of the transmitters has a predetermined bandwidth and the carrier frequencies of the transmitters are in accordance with the bandwidth of the transmitters.

10 Claims, 12 Drawing Sheets

RADIO FREQUENCY COMMUNICATION SYSTEM

This invention was made with Government support under Department of the Army Contract No. DAAB07-p94-C-A766 awarded by the United States Army.

BACKGROUND OF THE INVENTION

This invention relates generally to radio frequency (RF) communication systems and more particularly to spread spectrum communication systems.

As is known in the art, RF communication systems may be broadly classified into two types: A fixed carrier frequency system; and, a spread spectrum system. In a fixed carrier frequency system, each transmitting station is assigned a fixed-in-time, different carrier frequency. If a receiver wishes to receive information transmitted by one of the transmitting stations, the receiver is tuned to the carrier frequency of that transmitting station. While such fixed carrier frequency system is very effective in many applications, in applications where there is noise at the carrier frequency of the transmitter, such noise may "jam" the transmitter's signal thereby preventing a receiver tuned to a "jammed" carrier frequency from obtaining the transmitted information.

Spread spectrum systems are used to reduce the effect of such jamming signals. More particularly, in a spread spectrum system, the carrier frequency of each transmitter is changed over a relatively large bandwidth (i.e., the carrier frequency is "spread" over a relatively large frequency spectrum, (i.e., the so-called "spread spectrum bandwidth"). In a frequency hopping system, the carrier frequency is changed randomly. Typically, the change in carrier frequency is generated by a pseudo-random code generator. A receiver wishing to receive the transmitted signal must have knowledge of the pseudo-random code used by the transmitter (i.e., the "key") and a pseudo-random code generator "matched" to, and synchronized with, the pseudo-random code generator of the transmitter. Thus, the receiver is able to maintain track of, and thereby maintain itself tuned to, the transmitter's pseudo randomly changing carrier frequency. Thus, if the jamming frequency is at a fixed frequency, any individual transmitter is "jammed" for only a small portion of its transmission. By including redundant information in the transmitted signal, any information "corrupted" during a jamming interval may be recovered using various data recovery algorithms. As is also known in the art, in a frequency hopping system, each transmitter has an independent pseudo-random code generator controlling the frequency hopping of its carrier frequency. Thus, with a finite "spread spectrum bandwidth", it follows that there may be times when two transmitters are transmitting with, or approximately, the same carrier frequency, i.e., there are carrier frequency "collisions". Systems which result in frequency collisions are sometimes referred to as "non-orthogonal" frequency hopping systems. One technique used to statistically minimize these "collisions" reduces the total bandwidth used by the transmitters to less than the entire "spread spectrum bandwidth", typically to about 50% of the entire "spread spectrum bandwidth".

In another type of frequency hopping system, the plurality of transmitters are arranged to operate at different carrier frequencies having a preassigned frequency separation and the carrier frequencies change in accordance with a common pseudo-random code. In this system, because all transmitter carrier frequencies are initially non-overlapping and change in accordance with the same pseudo-random code, they will remain non-overlapping during hopping and thus there will be no frequency collisions. Such non-frequency collision systems are sometimes referred to as orthogonal frequency hopping systems.

SUMMARY OF THE INVENTION

In accordance with the invention, a spread spectrum radio frequency communication system is provided. The system includes a plurality of transmitters adapted to hop orthogonally in frequency over a predetermined band of frequencies. Each of the transmitters has a predetermined bandwidth. Each bandwidth has a center frequency. The center frequencies are arranged in accordance with the relative bandwidths of the transmitters.

With such an arrangement, encroachment of smaller bandwidth system users by larger bandwidth system users is reduced.

In accordance with another feature of the invention, transmitters having substantially equal bandwidth have carrier frequencies arranged in accordance with relative transmitter power.

With such an arrangement, encroachment of smaller bandwidth system users by larger bandwidth system users is further reduced.

In accordance with another feature of the invention, a spread spectrum radio frequency communication system is provided. The system includes a plurality of users. The system is adapted to operate over a predetermined band of frequencies. The users have initial preassigned relative carrier frequencies over only an assigned portion of the predetermined band of frequencies. The carrier frequencies change over the predetermined band of frequencies in accordance with a common pseudo-random code.

In accordance with another feature of the invention, a spread spectrum radio frequency communication system is provided having a plurality of user slots over a predetermined band of frequencies. Each of the first portion of the user slots have transmitters adapted to operate at different carrier frequencies within a predetermined band of frequencies. The carrier frequencies of the users in the first portion thereof are changed in accordance with a common pseudo-random code. A second portion of the user slots includes transmitters which have carrier frequencies randomly changing within such second portion of the slots in accordance with a code comprising the common pseudo-random code and a pseudo-random code unique to each one of the transmitters in the second portion thereof.

BRIEF DESCRIPTION OF THE DRAWING

These and other features of the invention, as well as the invention itself, will become more readily apparent from the following detailed description taken together with the accompanying drawings, in which.

DESCRIPTION OF THE PREFERRED EMBODIMENTS

Figure 1:
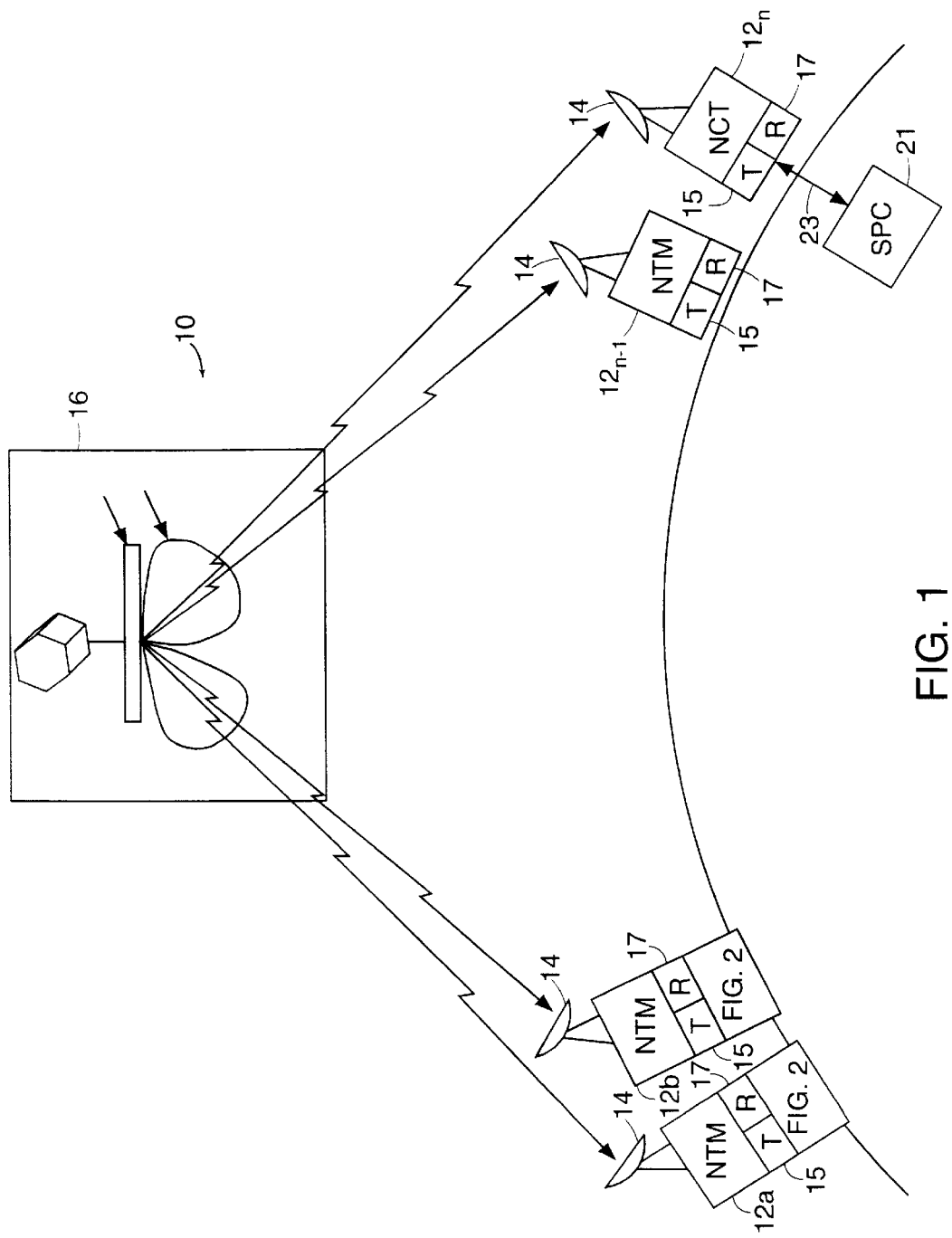
FIG. 1 is a sketch of a spread spectrum radio frequency communication system according to the invention.

Referring now to FIG. 1, a spread spectrum, radio frequency communication system 10 is shown to include a plurality of earth based transmit/receive terminals (i.e., Network Terminal Modems (NTMs) 12a–12n, sometimes also referred to hereinafter as users. (It should be understood that the earth based NTMs 12a–12n may be on moving platforms, such as a ship or truck). The NTMs 12a–12n are adapted to exchange information among such terminals 12a–12n through a satellite transponder system 16, as shown. An exemplary one of the NTMs 12a–12n, here 12a, is shown in more detail in FIG. 2.

Figure 2:
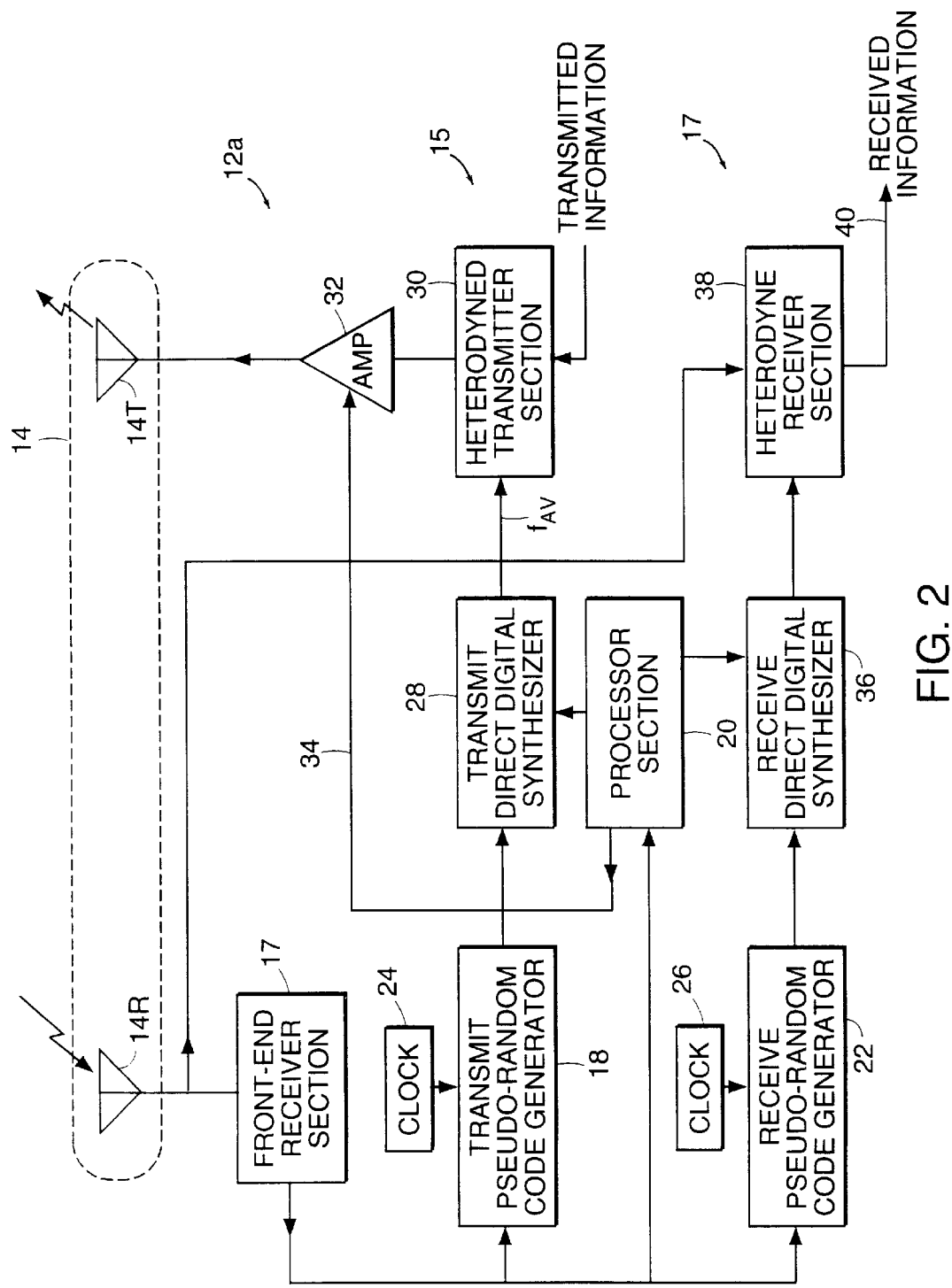
FIG. 2 is a block diagram of an exemplary one of a plurality of network modem terminals (NTMs) used in the system of FIG. 1.

Thus, referring to FIG. 2, the NTM 12a includes an antenna section 14. The antenna section 14 includes a transmit antenna 14T and a receive antenna 14R coupled to a transmitter 15 and a receiver 17, respectively, as shown. Signals relayed to NTM 12a by the satellite transponder system 16 are receiver by the receive antenna 14R. The received signals are fed to a front-end receiver section 17. The front-end receiver section 17 feeds a transmit pseudo-random code generator 18, a processor section 20 and a receive pseudo-random code generator 22. A clock 24 is also fed to the transmit pseudo-random code generator 18. The output of the transmit pseudo-random code generator 18 is fed to a transmit direct digital synthesizer (DDS) 28. The output of the transmit DDS 28 controls a heterodyning signal in a transmit heterodyning section 30. More particularly, information to be transmitted by NTM 12a is fed to the transmit heterodyning section 30 along with the output of transmit DDS 28. The signals produced at the output of the transmit DDS 28 sets the carrier frequencies of the transmit section of NTM 12a. The information carried by the selected carrier frequency produced by the transmit heterodyning section 30 is fed to a power amplifier 32. The power level of the power amplifier 32 is controlled by a control signal produced by processor section 20 on line 34.

The clock 26, which is synchronized with clock 22, is fed to the receive pseudo-random code generator 28. Here, the clocks 24 and 26 provide an accurate measure of the system 10 time-of-day (TOD), and may be combined into a common clock. The output of the receive pseudo-random code generator 22 is fed to a receive direct digital synthesizer (DDS) 36. The output of the receive DDS 36 controls a heterodyning signal in a receive heterodyning section 38. The receiver antenna 14R is also fed to the receive heterodyning section 38. The signals produced at the output of the receive DDS 36 tunes the receiver 17 of NTM 12a to the transmit carrier frequency of one of the other NTMs 12b–12n. The output of the heterodyning section 38 couples the received information to output line 40.

It is to be noted that each of the NTMs 12a–12n has the same pseudo-random code in both the transmit pseudo-random code generator 18 thereof and in the receive pseudo-random code generator 22 thereof. Further, the clocks 24, 26 fed to all pseudo-random code generators 18, 22 of all the NTMs 12a–12n lead or lag the system 10 time-of-day (i.e., the system 10 time-of-day being the time-of-day at the satellite transponder system 16) by a constant related to each NTM's 12a–12n propagation delay to the satellite transponder system 16. Thus, the same code is produced simultaneously by all pseudo-random code generators 18, 22 of all the NTMs 12a–12n. Further, as will be discussed in more detail, each of the carrier frequencies of the NTMs 12a–12n which subscribe to the system 10 have different bandwidths over a predetermined system 10 operating bandwidth, (i.e., Bandwidth Occupancy Plan (BOP)) which extends from a lower frequency, $f_{low}$, to an upper frequency, $f_{high}$. Thus, because the NTMs 12a–12n have transmitters arranged to operate at different carrier frequencies with preassigned frequency separation (i.e., different, non-overlapping bandwidth) and because the carrier frequencies change in accordance with a common pseudo-random code calculated in the generators 18, 22 of all of the NTMs 12a–12n, there will be no frequency collisions from frequency hop-to-frequency hop and thus system 10 is an orthogonal frequency hopping system.

One of the terminals 12a–12n, here terminal 12n, also serves as a Network Control Terminal (NCT). The Network Control Terminal 12n communicates with a System Planning Computer (SPC) 21 over a land-based, hardwired wide area network 23 and transmits control information to the other Network Terminal Modems 12a to 12(n-1) through the satellite transponder system 16. The control information transmitted to each of the NTMs 12a–12(n-1) includes: the number of NTMs 12a–12n which will be active during a succeeding super-epoch time interval; and the bandwidths of the NTMs 12a–12n to be active during such super-epoch.

During each of a sequence of super-epoch time intervals ($SEI_0$, $SEI_1$, . . . $SEI_N$, FIG. 3) the System Planning Computer (SPC) 21 determines the bandwidth and constructs an ordered list of bandwidths to be used by each of the Network Terminal Modems 12a to 12n during the next succeeding super-epoch time interval. The System Planning computer (SPC) 21 assigns each of the transmitters 15 of the Network Terminal Modems 12a–12n a relative position in the ordered list of bandwidths in accordance with the predetermined bandwidth and predetermined transmission powers (produced by the power amplifiers 32 in each of the NTMs 12a–12n). The information is sent to the NTMs 12a–12n by the SPC 21 as a defragmentation message (i.e., sometimes referred to herein as a "Defrag msg") and is stored in the processor sections 20 of such NTMs 12a–12n. That is, during each super-epoch time interval, the System Planning Computer (SPC) 21 informs each of the NTMs 12a–12n of the bandwidth of each Network Terminal Modem transmitter 15. Receivers 17 of the NTMs 12a–12n also receive this information from the defragmentation message and use it tune their receivers 17 to the frequency of the transmitter 15 it is to receive information from. The initiation of each super-epoch time interval is a priori known to each of the NTMs 12a–12n, as, for example, each minute of the system day. Once initially assigned (i.e., during each super-epoch time interval, SEI), the center frequencies of each bandwidth is randomly changed (i.e., frequency hopped) at hop interval HOP, in accordance with the common pseudo-random code, or sequence, calculated in all of the pseudo-random code generators 18, 22. Further, the receiver sections 38 maintain themselves in tune with the hopping center frequencies of the transmitter heterodyning section 30 from which the receiver heterodyning section 38 is to receive information.

Figure 3:
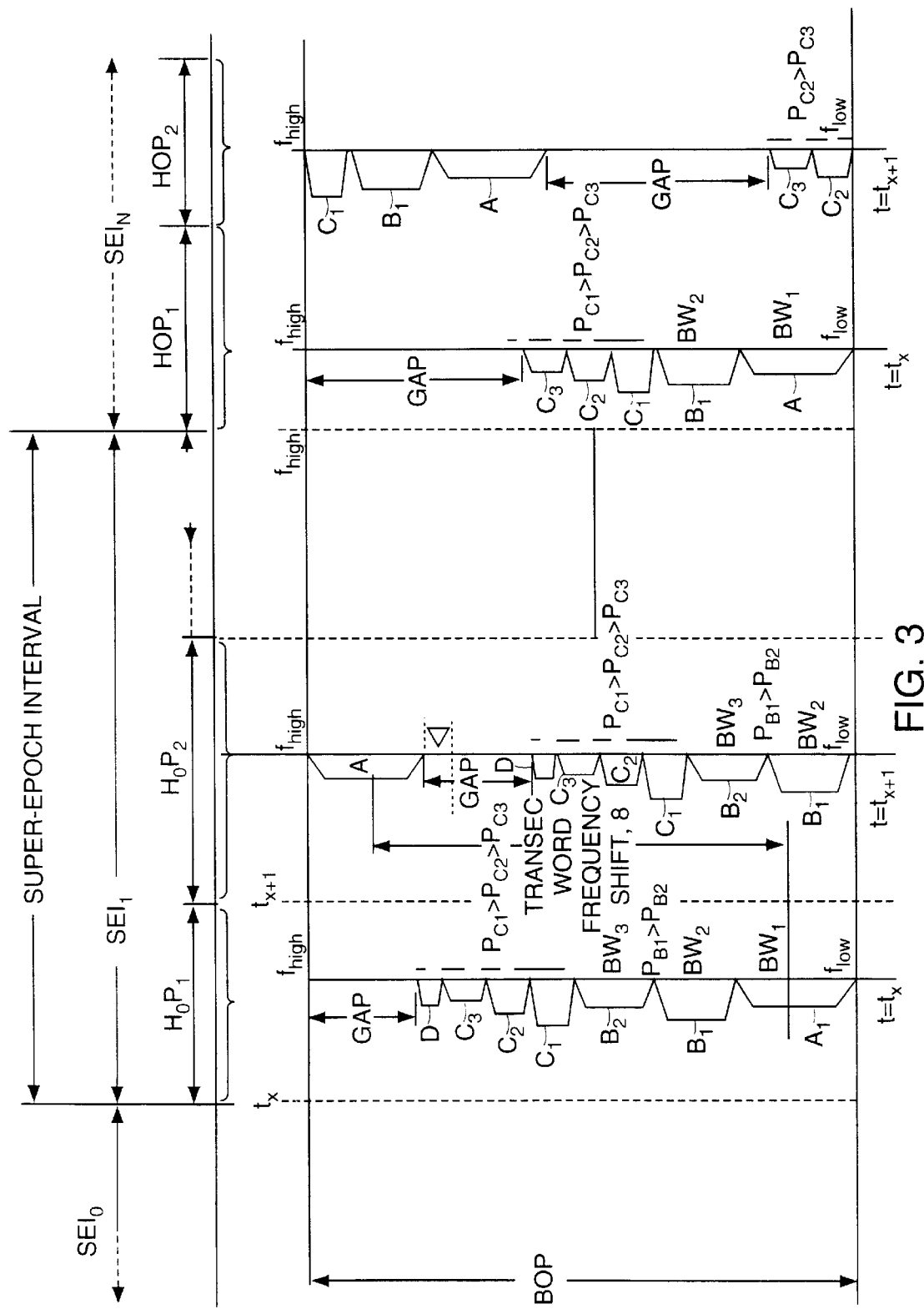
FIG. 3 is a timing diagram showing a sequence of super-epoch time intervals and, during each one thereof, orthogonal frequency hopping provided by the system of FIG. 1 to users of such system.

More particularly, during a preceding super-epoch time interval, for example, $SEI_0$, the SPC 21 produces a list of the NTMs 12a–12n to be active during the succeeding super-epoch interval, here $SEI_1$. The SPC 21 computes the information bandwidths of the NTMs 12a–12n to be active in a manner to be discussed and transmits such information (i.e., the defragmentation message) to the processor 20 of the NTMs 12a–12n during each super-epoch time interval, as described above. The SPC 21 also calculates the center frequencies of the NTMs 12a–12n to be active during the next SEI in the construction of the ordered list of user bandwidths. The SPC 21 orders active users in accordance with the following: The center frequencies of the transmitters 15 of the NTMs 12a–12n to be active during $SEI_1$ are arranged in order of bandwidth; and, if more than one of the transmitters to be active during $SEI_1$ has the same bandwidth, the center frequencies thereof are arranged in accordance with relative transmitter power, as shown in FIG. 3. That is, the System Planning Computer 21 allocates the bandwidth available to the radio communication system 10 i.e., the BOP) to the Network Terminal Modems NTMs 12a–12n to be active during the succeeding super-epoch time interval based on the different bandwidth and power requirements of such NTMs 12a–12n. During each super-epoch time interval $SEI_1, \ldots SEI_N$, the center frequencies of the NTMs hop randomly in accordance with the common pseudo-random code operational in the generators 18, 22, as shown in FIG. 3 for hop intervals $HOP_1$, $HOP_2$ . . . , as shown. The hop interval $HOP_1$, $HOP_2$ begin at times $t_x$, $t_{x+1}$, respectively, as shown.

For example, referring to FIG. 3, the system 10 has a predetermined operating bandwidth, (i.e., the Bandwidth Occupancy Plan (BOP)) which extends from a lower frequency $f_{low}$ to an upper frequency $f_{high}$. Here, in this example there will be seven active users (i.e., NTMs 12a–12n designated as A, B1, B2, C1, C2, C3, and D, as shown) in the up-coming (i.e., next) super-epoch time interval, $SEI_1$. User A has the largest bandwidth. Users B1 and B2 have the same bandwidth, such bandwidth being second in size to the bandwidth of user A. Users C1, C2 and C3 have the same bandwidth, such bandwidth being third in size to the bandwidth of user A. User D has the smallest bandwidth. User B1 transmits with a power level greater than user B2. User C1 transmits with a power level greater than user C2. User C2 transmits with a power level greater than user C3. Finally, it is noted from the example in FIG. 3 that the sum of the bandwidth of the seven users A, B1, B2, C1, C2, C3, and D is less than the Bandwidth Occupancy Plan (BOP) by a frequency band, "GAP", i.e., a frequency region that does not contain active users.

During the preceding super-epoch time interval, $SEI_0$, a request is made by the Network Control Terminal (NCT) 12n for the System Planning Computer 21 to establish new NTM connections (i.e., add new NTMs or users) to the system 10, maintain NTM existing connections, or terminate previous NTM connections. In response to such request, during the previous super-epoch time interval $SEI_0$, the SPC 21 computes, for the next super-epoch time interval $SEI_1$, an initial order for the NTM transmitter bandwidths of the NTMs to be active during $SEI_1$. The NCT, i.e., NTM 12n, then relays control information computed by the SPC 21 back to the NTMs 12a–12(n–1) via the satellite transponder system 16 in order to coordinate their operation in accordance with the bandwidth allocation and in response to the common pseudo random sequences generated in the generators 18, 22. The center frequency of each user is to pseudo-randomly change in accordance with a common pseudo-random code, or sequence, from hop-to-hop within each super-epoch time interval (SEI).

In summary, the SPC 21 generates a list, ordered by user bandwidth, of active users during each super-epoch interval.

The bandwidths are calculated in a manner to be described. Suffice it to say here, however, that the bandwidth of each active user (NTM) is calculated in accordance with an algorithm (i.e, an Adjacent Channel Interference (ACI) algorithm to be described) designed to assure that the bandwidth (i.e., information bandwidth of the user) causes the center frequency separation between adjacent users to satisfy a criteria such that adjacent users can only introduce ACI at a noise level that the system 10 is designed to operate satisfactorily. The SPC 21 generates the defragmentation message (i.e., a Defrag msg) for broadcast to all NTMs 12a–12n of: An ordered list of User bandwidths (calculated as per an ACI algorithm, to be described); and a user identification (ID) field (sometimes referred to as an Alias).

Upon receipt of the defragmentation message from the SPC 21, such message to be activated at the initiation of the next super-epoch interval (i.e., super-epoch boundary), the users (NTMs) can determine if they are to: 1) remain an active user, 2) become an active user, or 3) determine if they have been dropped as an active user, during the next super-epoch interval. The system 10 handles all such cases seamlessly, in that the active system 10 users may differ on the last hop of a super-epoch interval from the first hop of the next super-epoch interval. Maintaining the orthogonal condition requires that each user (NTM) processor section 20 perform its own center frequency calculation, to be described in connection with FIGS. 9A–9F), of where to center its information bandwidth, for each frequency hop. Since a new random center frequency is generated each frequency hop, each user determines when a center frequency will be a linear shift in frequency within the BOP or a wrap to an edge of the BOP in a manner to be described. That determination depends on the user's position within the ordered list of user bandwidths and the randomly calculated center frequency for the current hop. Independent center frequency calculation is met by having a common ordered database (i.e., the information in the defragmentation message ("Defrag msg") of user bandwidths) and a common pseudo-random sequence generator 18, 22 at all active users 12a–12n.

Thus, a "Defrag msg" is an ordered list of users 12a–12n to be active during the next super-epoch interval in order of decreasing bandwidth. If a user is to be deleted during the next super-epoch time interval, the current ordering of users would be fragmented in bandwidth, i.e., have an unused region in the middle of the band of users to be active during the next super-epoch. Without a new defragmentation message which eliminates the bandwidth of the user to be deleted by moving the adjacent active users during the next super-epoch time interval together, the BOP would fragment., i.e., regions of the BOP would be lost as useable bandwidth for new users.

The center frequencies for the users are computed by the SPC 21 in accordance with the following criteria:

a) only non-overlapping frequency bands are assigned to different NTMs;

b) adjacent frequency bands are assigned to NTMs with similar bandwidth;

c) adjacent frequency bands are assigned to NTMs with similar power if their bandwidth are equal.

As noted above, the individual processor section 20 of each of the NTMs 12a–12n to be active during the super-epoch, computes its randomly changing center frequency during each of the hops in the super-epoch. The use of a common pseudo-random code or sequence for computing the center frequencies (frequency hops) prevents collisions;

(i.e., the system 10 is orthogonal). More particularly, the pseudo-randomness in the sequence of center frequencies (frequency hops) for any active NTM 12a–12n is introduced by computing within each NTM processor 20 for each hop interval (HOP$_1$, HOP$_2$, . . . ) a frequency shift (i.e, Offset frequency) within the operating band (BOP) of the overall system based on a common pseudo-random number generated by the pseudo-random generators 18, 22. The number generated by the pseudo-random generators 18, 22 is referred to herein as a TRANSEC word. Thus, the pseudo-randomness in the sequence of center frequencies (frequency hops) for any active NTM 12a–12n is introduced by computing within each NTM processor 20 for each hop interval (HOP$_1$, HOP$_2$, . . . ) the frequency shift.

More particularly, referring to FIG. 3, assume for purposes of illustration that at the first frequency hop, HOP$_1$, the pseudo-random code generators 18, 22 select a frequency hop, or frequency shift, δ. This frequency shift, δ, is the difference between two consecutive TRANSEC words. The two consecutive TRANSEC words are randomly selected at each hop interval, HOP$_1$, HOP$_2$ . . . . The difference between two consecutive TRANSEC words is computed for each hop and is referred as a TRANSEC WORD. The same TRANSEC WORD, or frequency shift, is calculated by each of the active NTMs 12a–12n to provide the same linear frequency shift to the center frequency of the NTMs transmitters 15 and receivers 17 (FIG. 2).

Thus, referring also to FIG. 3, the ordering of NTMs A, B1, B2, C1, C2, C3, and D, for HOP$_1$ of super-epoch SEI$_1$ described in FIG. 3, is shown. Assume that during HOP$_2$ of SEI$_1$, the TRANSEC WORD, δ, requires a shift in frequency to the right as shown in FIG. 3. It is noted that while NTM A will still remain within the Bandwidth Occupancy Plan (BOP) of the system for the TRANSEC WORD, only a portion, Δ, of the bandwidth of NTM B1 will remain in the Bandwidth Occupancy Band (BOP) and the other NTMs B2, C1, C2, C3, and D will be shifted completely outside the BOP. Thus, the processor 20 in each one of the NTMs 12a–12n calculates the center frequencies of the partially out of band NTM B1 and the fully "out-of-band" NTMs B2, C1, C2, C3, and D so that the bandwidth occupied by these NTMs B2, C1, C2, C3, and D fold-back, or wrap around, to the lowest frequency, $f_{low}$, in the Bandwidth Occupancy Plan (BOP), as shown in FIG. 3.

Further, the center frequency of user A is further shifted the amount Δ so that the upper frequency of users A is at the highest frequency $f_{high}$ in the BOP, as shown in FIG. 3. As noted in FIG. 3, the GAP is preserved. Thus, with a fully occupied Bandwidth Occupancy Plan, the loss of the spectral region Δ would have fragmented the BOP and caused a condition where all NTMs may no longer have fit within the BOP.

Thus, as described, on a per hop basis, the active ones of the NTMs 12a–12n generate the same TRANSEC WORD on each hop and performs a calculation in the processor 20 which would cause that NTM to hop to another frequency. Since the hopping bandwidth (BW) is defined by the BOP, and the TRANSEC WORD must cover the complete BOP, it is possible that a frequency shift calculation based on a TRANSEC WORD would cause some NTMs to calculate a new frequency position outside the BOP interval. That condition is not allowed. In such case, each NTM must determine if the TRANSEC WORD based shift would place that user outside the BOP. Those NTMs that can shift the TRANSEC WORD amount and remain within the BOP perform a linear shift along the frequency axis. The linear shift consists of two elements: (1) a TRANSEC WORD based shift; and (2) an additional Δ shift calculated to keep from fragmenting the BOP interval. NTMs that calculate their new shifted position as outside the BOP implement a circular shift strategy. That is, NTMs where any portion of their frequency spectrum would fall outside the BOP wrap around to the other end of the hopping bandwidth (i.e., BOP). The characteristics of interest after the hop are as follows:

1. If a TRANSEC WORD based frequency shift of a NTM's spectral position results in that NTM having any portion of its allocated bandwidth (BW) falling outside the allocated BOP, those NTMs must wrap around to the other end of the BOP;
2. The relative position of all active NTMs remain identically the same;
3. Fragmentation of the BOP does not occur because the potentially lost bandwidth Δ is dynamically calculated on a per hop basis and recovered; and
4. The GAP moves and remains constant between the highest and lowest bandwidth NTMs, whenever the frequency shift causes a wrapping to occur.

Each active user, NTM, of the system 10, as noted above, needs to determine the effect of the next calculated hopping frequency on their next center frequency position. Each user's calculated hop frequency must result in a unique frequency within the BOP and the sum of all user bandwidths must be contained within the BOP. On each hop, each user perform a real-time calculation which meets these requirements.

FIGS. 4A–4C through 7A–7C illustrates examples of the user ordering and direction of shift (right or left). The conditions shown in FIGS. 4A, 5A, 6A and 7A are per hop reference positions, selected based on a TRANSEC WORD, on a per hop basis. FIGS. 4B–4C, 5B–5C, 6B–6C and 7B–7D illustrate four different frequency shift results that could apply to the initial conditions. Users are labeled based on whether the current hop is ordered in decreasing/increasing order of bandwidth. Based on taking the difference of two positive, long integer TRANSEC words produced by the pseudo-random code generators 18, 22, the processor 20 determines the TRANSEC WORD and determines whether the current hop will be a right or left shift of an amount based on the magnitude of the difference the two consecutive TRANSEC words produced by the pseudo-random code generators 18, 22. The sign of the difference the two consecutive TRANSEC words produced by the pseudo-random code generators 18, 22 determines whether the shift in frequency will be to the right or to the left.

Figure 4A:
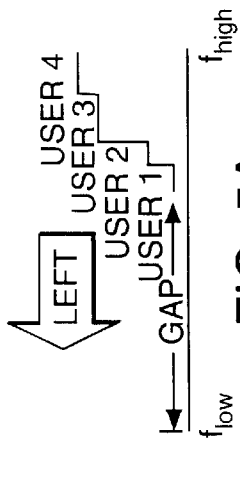
FIGS. 4A–4C through 7A–7C are additional diagrams useful in understanding the frequency hopping process performed by the system of FIG. 1.
Figure 4B:
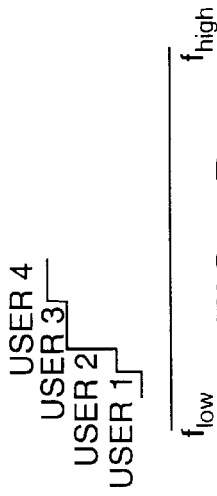
Figure 4C:
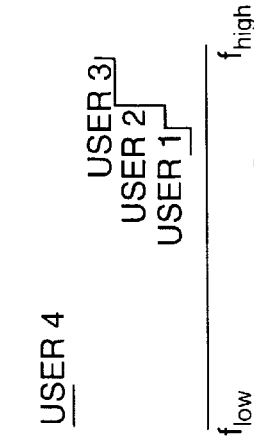
Figure 5A:
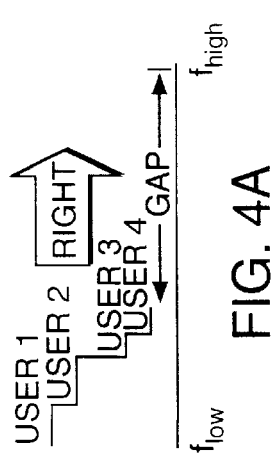
Figure 5B:
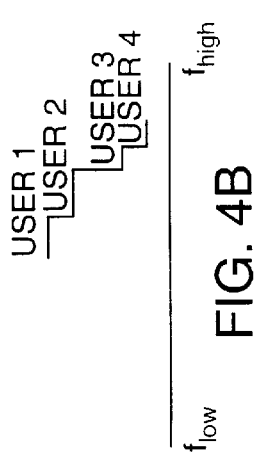
Figure 5C:

FIGS. 6A–6C and 7A–7C illustrate the initial condition and the results of shifting, when the unused BOP interval (i.e., the GAP) is divided equally on either side of the occupied bandwidth (BOP). FIGS. 4A–4C and 5A–5C illustrate the case where the GAP is positioned totally on one side of the occupied bandwidth (BOP) and illustrate the results that will occur when the occupied bandwidth (BOP) is shifted into the GAP interval, respectively. As shown in FIGS. 4B, 5B, 6B, and 7B, some shifts may be a linear move along the frequency axis. As shown in FIGS. 4C, 5C, 6C, and 7C some shifts cause a wrap to occur. The complete wrapping process is designed to preserve a GAP between the highest and lowest bandwidth users. For example, FIGS. 4A, 4B, and 4C, represent user who is ordered in decreasing order of bandwidth and will be shifted to the right. FIG. 4A illustrates the relative carrier frequency position of the users within the BOP at the beginning of the Hop Interval. FIG. 4B illustrates the condition where a right shift was small enough to keep all users within the BOP. FIG. 4C illustrates the condition where a right shift caused some of the users to wrap around from the high end of the BOP to the low end of the BOP. FIGS. 5A–5C, 6A–6C and 7A–7C illustrate the same conditions as in FIGS. 4A–4C, except for the different initial relative carrier frequency position conditions illustrated in FIGS. 5A, 6A and 7A.

It should be noticed that when a calculated TRANSEC WORD causes users to wrap from one end of the BOP to the other, there is no fragmented bandwidth left at either end of the BOP. This is a result of the wrap calculation which contains both a TRANSEC WORD and a delta (Δ) value. The delta value, Δ, is the amount of bandwidth that would have been lost if a TRANSEC WORD could cause a user to be arbitrarily wrapped to the other end of the BOP. When the BOP is fully allocated to users, a TRANSEC WORD must not result in the inability of packing all users into the BOP, after the shift is applied. Application of the delta, Δ, calculation assures that a TRANSEC WORD does not result in fragmenting the GAP and creating a condition where users which formerly fit within the BOP cannot now be placed within the available BOP. Thus, the process always results in a hop frequency calculation where all the users that fit within the BOP on the previous hop now also fit.

To put it another way, each processor 20 determines whether the bandwidth of any one of the users 12a–12n to be active during the next super-epoch interval (SEI) will, after being shifted the randomly selected frequency increment, δ, fall outside of the predetermined system bandwidth (BOP). If so, the processor 20 determines the portion, Δ, of the bandwidth of the first user to be partially inside the BOP. The processor 20 will cause the transmitters with shifted frequency spectra (i.e., bandwidth) to remain fully within the predetermined system bandwidth (BOP) having the carrier frequencies thereof shifted by the randomly selected frequency increment, δ, algebraically added to the portion, Δ, to shift the bandwidth of such transmitters to one end of the predetermined system bandwidth. The processors 20 will cause the bandwidth of the transmitter partially falling outside the predetermined system bandwidth (BOP) to be shifted to the other extreme of the predetermined system bandwidth (BOP) with the bandwidth of the transmitters being maintained in different regions of a predetermined band of frequencies during each of the frequency hops as the carrier frequencies are randomly frequency shifted.

As noted above, during each previous super-epoch interval, the System Planning Computer (SPC) 21 computes a list of the NTMs to be active during the next succeeding super-epoch time interval by sorting the NTMs to be active during the up-coming super-epoch in decreasing bandwidth and in decreasing power for equal bandwidth as shown in FIG. 4A. This list will be transmitted via a "Defrag msg" to the NTMs 12a–12n before start of the next super-epoch time interval. During each hop interval in a super-epoch time interval, all NTMs 12a–12n compute the same, randomly generated TRANSEC WORD. For each one of the sequence of hops, $HOP_1$, $HOP_2$ in the super-epoch, the NTMs compute, for each of the HOPs, the same linear random frequency shift to be applied to its transmitters center frequency, as follows:

a) each NTM 12a–12n calculates in its processor section 20 its new frequency position so that its lower band edge is moved by the frequency shift, δ, and subsequent NTMs also compute in their processor section 20 their new frequency positions so that their lower band edge is at the upper band edge of the previous user stopping if the upper band of that NTM would exceed the upper band of the overall system (i.e., BOP);

b) further shift those NTMs already assigned by shifting their center frequencies an equal amount so that the upper band edge of the last assigned NTM is at the upper band edge of the overall system (BOP);

c) assign the next NTM (the one who would have exceeded the system band) so that its lower band edge is at the lower band edge of the overall system and subsequent NTMs so that their lower band edge is at the upper band edge of the previous NTM.

This results in the unused band (i.e., GAP) to be contiguous and also guarantees that the sum of the NTM bandwidth fits in the overall system bandwidth (BOP), the procedure will result in a valid (non-overlapping band) assignment.

Four features, as shown in FIGS. 4A–4C through 7A–7C, are added to this simplified procedure in order to increase the variability of the hopping pattern:

a) The frequency shift is sometimes performed in the reverse frequency direction (i.e., assign the largest bandwidth user to have its upper band edge at the $f_{high}$ end of the BOP or middle of the BOP). This randomly selected reference position also chooses a left frequency shift operation (FIGS. 5A–5C and FIGS. 7A–7C);

b) The list of NTMs is sometimes reversed, again depending on the pseudo-random number;

c) The frequency shift, δ, which is a function of pseudo-random numbers (i.e., two consecutive TRANSEC words, that is the TRANSEC WORD), is computed as a random frequency difference from either the low or high band edge of the overall system (BOP).

Figure 8:
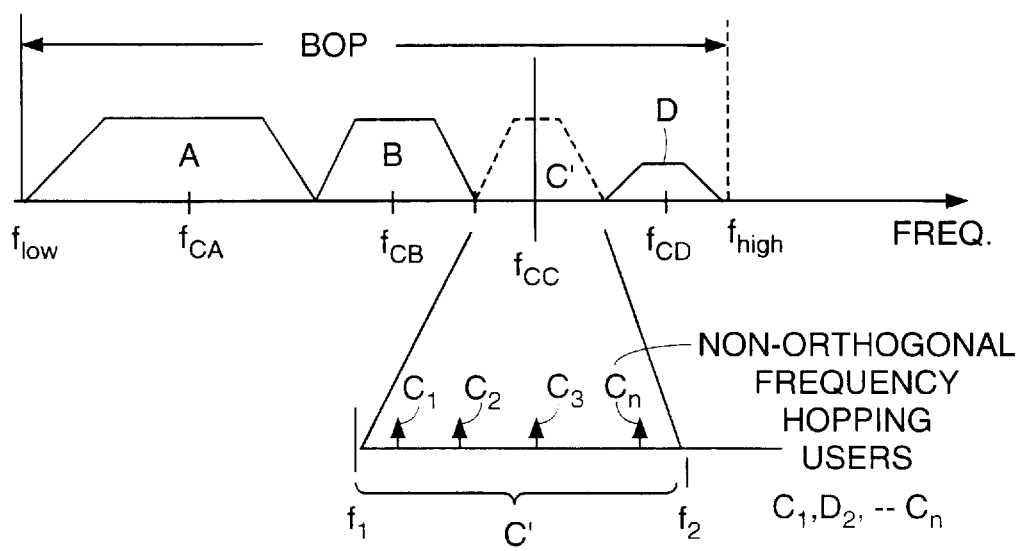
FIG. 8 shows allocation of the frequency spectrum of the orthogonal frequency hopping system of FIG. 1 with the bandwidth of one user of the system having a non-orthogonal frequency hopping system.

Referring now to FIG. 8, a condition is shown where the system 10 is adapted to handle four users, i.e., user A, user B, "user C", and users D. Here, however, the bandwidth allocated to "user C" is a "phantom user". That is, the system 10 has allocated frequencies $f_1$ through $f_2$ of the BOP for use by another communication system, such as for use by a non-orthogonal frequency hopping system. The "user C" is referred to as a "phantom user". It is first noted that the SPC 21 assigns the center frequency $f_c$ in accordance with the relative effective bandwidth and power of the "non-orthogonal users" in the "orthogonal user C" slot. That is, assume that the non-orthogonal system includes users $c_1$, $c_2, \ldots c_n$, as shown. It is noted that users $c_1, c_2, \ldots c_n$ among themselves, (i.e., within the frequency band from $f_1$ though $f_2$) change frequency (i.e., frequency hop) in accordance with that users unique pseudo-random code (i.e., the users $c_1, c_2, \ldots c_n$, among themselves, do not frequency hop based on a common random code). However, because "user C" is actually a bandwidth treated by system 10 as a user of the system, the bandwidth slot allocated for "user C" frequency hops orthogonally with respect to users A, B and D.

To put it another way, referring to FIG. 8, the spread spectrum radio frequency communication system 10 includes users A, B, C, and D. Users A, B and D are adapted to operate at different carrier frequencies having initial preassigned carrier frequencies and which change in accordance with a common pseudo-random code. Users C (i.e. user $c_1, c_2, \ldots c_n$) are adapted to operate at different carrier frequencies which randomly change in accordance with a code comprising the common pseudo-random code and a pseudo-random code unique to each one of the users in the user C.

The effective bandwidth of "user C" is the sum of the bandwidths of the users $c_1, c_2, \ldots c_n$ and the effective power of "user C" is the sum of the powers of the users $c_1$, $c_2, \ldots c_n$. Thus, here the effective bandwidth of "user C" is less than the bandwidth of user B and greater than the bandwidth of user D. If, for example, the bandwidth of user B was equal to the effective bandwidth of "user C", the ordering would be based on the power of user B relative to the effective power of "user C". If, in such example, the power of user B was greater than the effective power of "user C", user B would be at a lower frequency band than "user C", in this example.

In summary, on a per hop basis, each active user accesses TRANSEC words. More particularly, each user generates identical TRANSEC words from the pseudo-random code generators 18, 22 on each hop and performs a portion of the hop calculation such that the user hops to another frequency orthogonal to all others. Since the hopping bandwidth (BW) is defined by the BOP, and the TRANSEC WORD covers the complete BOP, it is possible that a frequency shift calculation based on a TRANSEC WORD could cause some users to calculate a new frequency position outside the BOP interval. That condition is not allowed. Using the ordered list of user bandwidths, each user determines if the TRANSEC WORD would place that user outside the BOP. Those users that can shift the TRANSEC WORD calculated amount and remain in the BOP, perform a linear shift along the frequency axis. The linear shift consists of two elements, 1) a TRANSEC WORD and 2) an additional Delta shift value to keep from fragmenting the BOP interval. If some users 12a–12n calculate their new shifted position as outside the BOP, they implement a circular shift strategy.

At a time $t=t_{x+1}$, FIG. 3 shows a right shift that would cause some users to hop outside the designated frequency range allocated in the BOP for the system 10 having the BOP, as shown. As shown in FIG. 3, any user having a frequency spectrum (i.e., bandwidth) which would fall outside the BOP region is wrapped around to the other end of the hopping BW.

The amount of the BOP (i.e., Delta) that would have been fragmented due to the TRANSEC WORD is saved by the algorithm. This is a critical feature for a BOP that is fully utilized. In that case, if the Delta is not recovered, a TRANSEC WORD could fragment the BOP in such a way that the users would no longer fit within the reduced BOP. Since it is a goal of the system to have full bandwidth utilization, this strategy supports that goal without wasting bandwidth by requiring a reserve to handle fragmentation.

The characteristics of interest after the hop are as follows: If a TRANSEC WORD shifts a user's bandwidth such that the user's allocated bandwidth (BW) falls outside the allocated BOP, those users must be wrapped around to the other end of-the BOP; The relative position of all users remains identically the same; Fragmentation of the BOP does not occur because the potentially lost bandwidth "Delta" is dynamically calculated on a per hop basis and recovered; and, The GAP moves but remains between the highest and lowest bandwidth users, whenever the frequency shift causes a wrapping to occur.

A new user may request to be added to the network by acquiring the NCTs broadcast RF Control Circuit and responding to that NCT with a Reportback Control Circuit message. Similarly, the NCT is informed that a user is to be dropped because the NCT recognizes that a formerly active user is no longer responding. The management of users that are added/dropped/pre-empted from network is accomplished by a Network Management Function (NMF) hosted within the NCT 12n updating its data base to reflect the new network configuration and enabling the NCT 12n to format and transmit a "Defragmentation message" to all users 12a–12(n–1), over RF Links. (A "Defragmentation Message is actually an ordered list of the current users in order of decreasing bandwidth. As soon as a user is deleted, the existing new ordering would be fragmented in bandwidth, e.g., have an unused frequency region in the middle of a band of active users.

Whenever the composition of active users is changed, it is necessary to reapply the pre-programmed rules which determine relative order of users and thus the position and frequency span of the "Gap". This redefined configuration is transmitted via a Defragmentation Update Message from NCT 12n to communicating NTMs 12a–12(n–1) and activated at the discrete times defined by super-epoch intervals.

The Defragmentation Message establishes an initial ordering in decreasing bandwidth order from $f_{low}$ along the frequency axis (FIG. 3).

As noted above in connection with FIGS. 4A–4C through 7A–7D, when a calculated TRANSEC WORD causes users to wrap from one end of the BOP to the other, there is no fragmented bandwidth left at either end of the BOP. This is a result of the wrap calculation which contains both a TRANSEC WORD based element and a "delta" value. The delta value is the amount of bandwidth that would have been lost if a TRANSEC WORD could cause a user to be arbitrarily wrapped to the other end of the BOP. When the BOP is fully allocated to users, a TRANSEC WORD must not result in the inability of packing all users into the BOP, after the shift is applied. Application of the delta calculation assures that a TRANSEC WORD does not result in fragmenting the Gap and creating a condition where users which formerly fit within the BOP cannot now be placed within the available BOP. Thus, the complete algorithm always results in a Hop calculation where all the users that fit within the BOP on the previous hop now also fit.

An initial "Test" frequency shift, δ, is calculated by the processor 20 by taking the difference of two consecutive TRANSEC words. Thus, the processor 20 calculates a signed Offset parameter (i.e., the signed frequency shift). The sign is interpreted as a shift direction, thus both right or left frequency shifts randomly occur. The magnitude of Offset is the amount of frequency shift that is tested and used in the algorithm to determine the final frequency position of a user.

Before the system can actually begin to operate, an initial "Alias" message must be broadcast to all defined active users. This Alias message is used by a user to determine if such user will be active during the next super-epoch as will be described in connection with 9A.

As noted above, the SPC 21 calculates the bandwidth of each of the users 12a–12n. The relationships required to calculate the RF bandwidth of a user (for example, user$_x$), as a function of the data rate of the adjacent lower (or equal) data rate user will now be discussed. Assume three adjacent users, e.g., user$_x$, uses$_{x+1}$, and users$_{x+2}$. The users user$_x$, uses$_{x+1}$, and users$_{x+2}$ are ordered in decreasing order of data rate, during the system planning and retain their relative order throughout the processing. The spacing between the instantaneous hop center frequencies, of two adjacent users, is the sum of two independent bandwidth calculations. For example, BW$_x$ (i.e, the bandwidth of user$_x$) is a function of R$_x$ (the data of user$_x$) and R$_{x+1}$ (i.e., the data rate of adjacent user$_{x+1}$), whereas BW$_{x+1}$ (the bandwidth of user$_{x+1}$ is a function of R$_{x+1}$ and R$_{x+2}$ (the data rate of user$_{x+2}$). Here:

$$BW_x = Rcb_x * (NORM_{(x,x+1)}), \text{accuracy} = 0.1\%, \text{and}$$

$$Rcb_x = \{(R_x) * (\text{framing bit expansion ratio}) *$$

-continued (error correcting encode expansion ratio) +

(synchronization word + start bit + stop bit)]/

(ratio of transmission time to total frame time)

$NORM_{(x,x+1)}$ = Minimum of {(equation) or $C_{max}$} where equation = $A + 0.183 * \log_{10}[\text{Maximum of } (R_x/R_{x+1} \text{ or } 1)]$ The accuracy of the $BW_x$ calculation should be 0.1%. For example, for a 64 Kbps user, this represents approximately 100 Hz. The constants A and $C_{max}$ are a function of the designed ACI loss. TABLE below presents sample values:

TABLE

| Parameter | 0.5 db ACI loss | 0.8 db ACI loss |
|---|---|---|
| A | 0.641 | 0.605 |
| $C_{max}$ | 0.893 | 0.844 |

From the equations above it is seen that the calculation only requires the user data rates and the adjacency information ($R_{x+1}$). The calculation must be performed at the system planning level in order to determine the occupancy of the BOP. Since a users bandwidth is a function of the data rate of their adjacent lower (or equal) data rate user, either adding or deleting a user effects the amount of bandwidth required by the user adjacent to the added or deleted user.

Figure 9A:
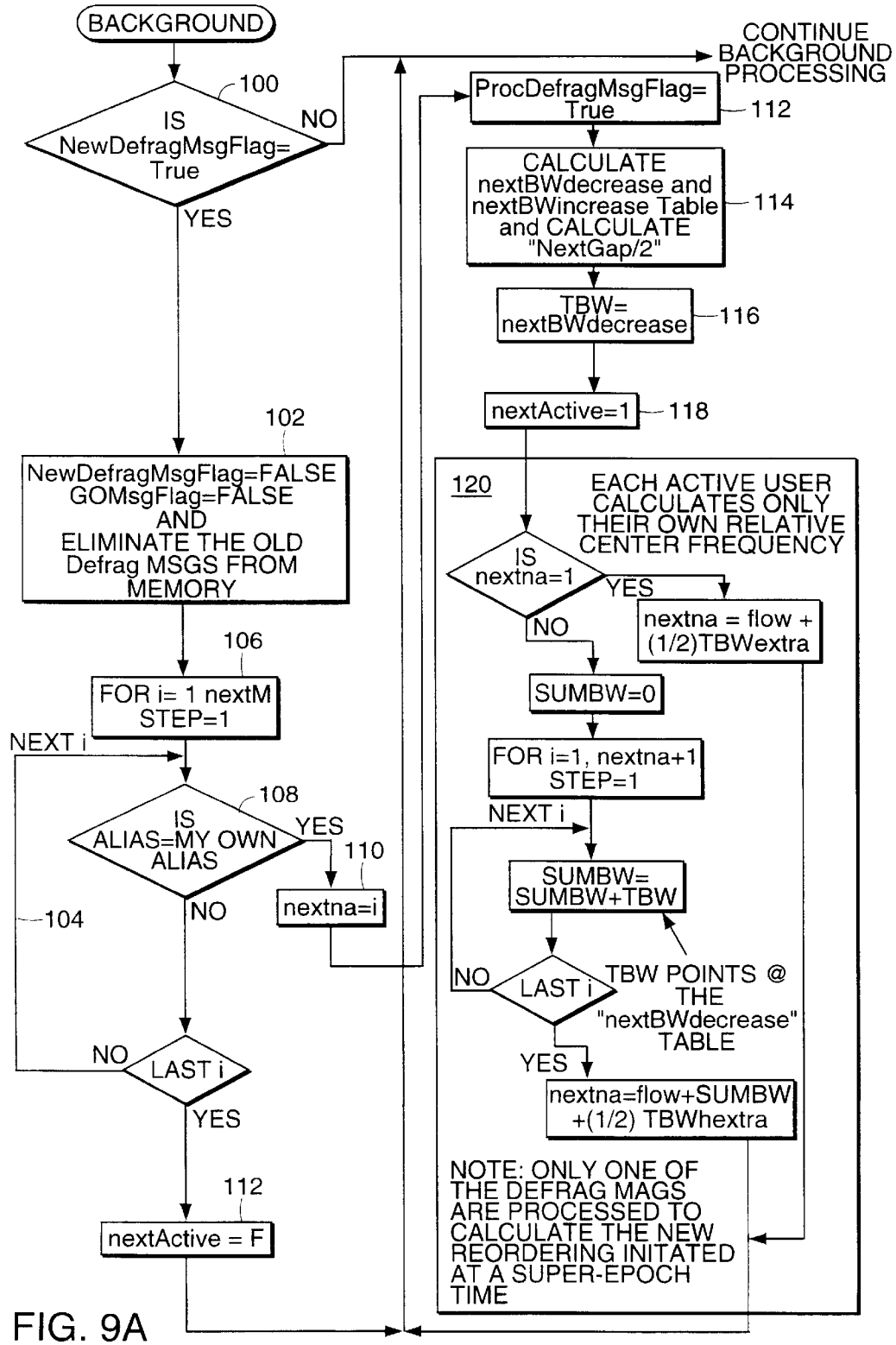
FIGS. 9A–9F are flow diagrams useful in understanding the operation of the system of FIG. 1.

FIGS. 9A–9F are detailed flow diagrams used to calculate hop frequency. FIG. 9A is a flow diagram of "Background Hop Processing" used at an NTM. Background processing is performed by each user's processor 20 in response to each received defragmentation message received from the SPC 21 and is calculated by in the user's processor 20 calculation of hop frequency. Thus, in Step 100 the processor 20 detects whether a new defragmentation message is received. If it has, the process proceeds to Step 102. In Step 102, control flags are reset and old defragmentation messages are removed from the processor 20. The process proceeds to perform a loop 104 wherein the processor 20 determines if it (i.e., the NTM) is to become an active user during the next super-epoch. More particularly, in step 106 a temporary index "i" is established with a range of 1 to the number of users to be active during the next super-epoch (nextM). In Step 108 the NTM determines whether the user is to be included as an active user during the next super-epoch; i.e., the user determines whether it is in the list of users, i.e., Alias, sent by the SPC 21 in the defragmentation message). (It is noted that the term Alias refers to the user's identification (ID). If the user is not on the list, the loop 104 exits and the process proceeds to Step 112 and a nextActive flag is set to False (F). If the user is on the list the loop 104 exits and the process proceeds to Step 110. In step 110 a parameter nextna is set equal to i (where "i" is the determined position of the user in the ordered bandwidth list).

Figure 6A:
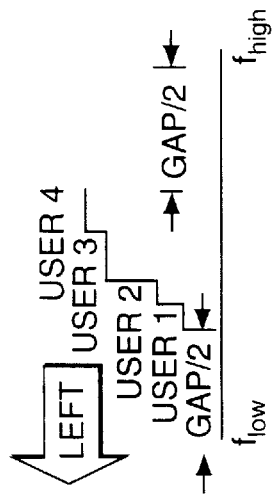
Figure 6B:
Figure 6C:
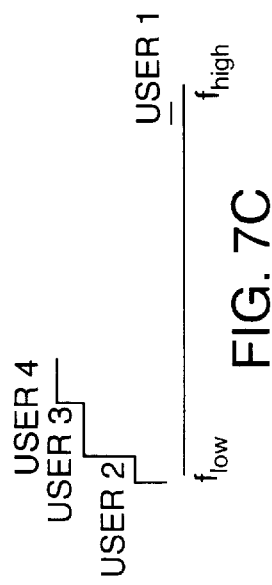
Figure 7A:
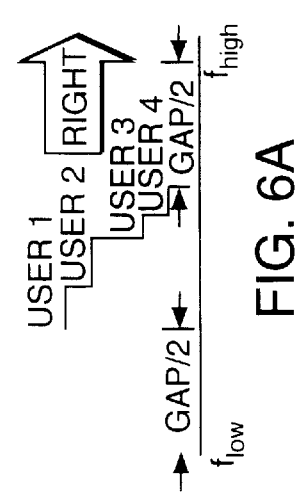
Figure 7B:
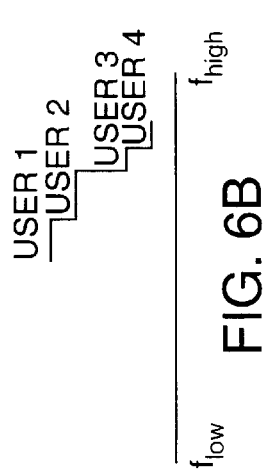
Figure 7C:
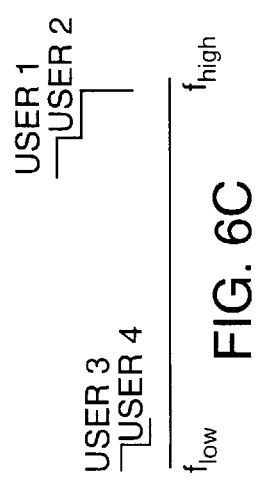

The process proceeds to Step 112 where a ProcDefragMsg Flag is set True. In Step 114 Tables are constructed to order bandwidths described above in connection with FIGS. 4A, 5A, 6A and 7A. FIGS. 4A and 6A use a BWdecrease Table and FIGS. 5A and 7A use BWdincrease Table. The Step 114 also calculates nextGAP/2 which is used in connection with FIGS. 6A and 7A when the reference positions are in the center of the BOP. In Step 116 a TBW pointer is created which points to the first address of the nextBWdecrease Table. In Step 118 the nextACVTIVE flag is set to True (T). In loop 120, the relative center frequency position for this user is calculated.

Figure 9B:
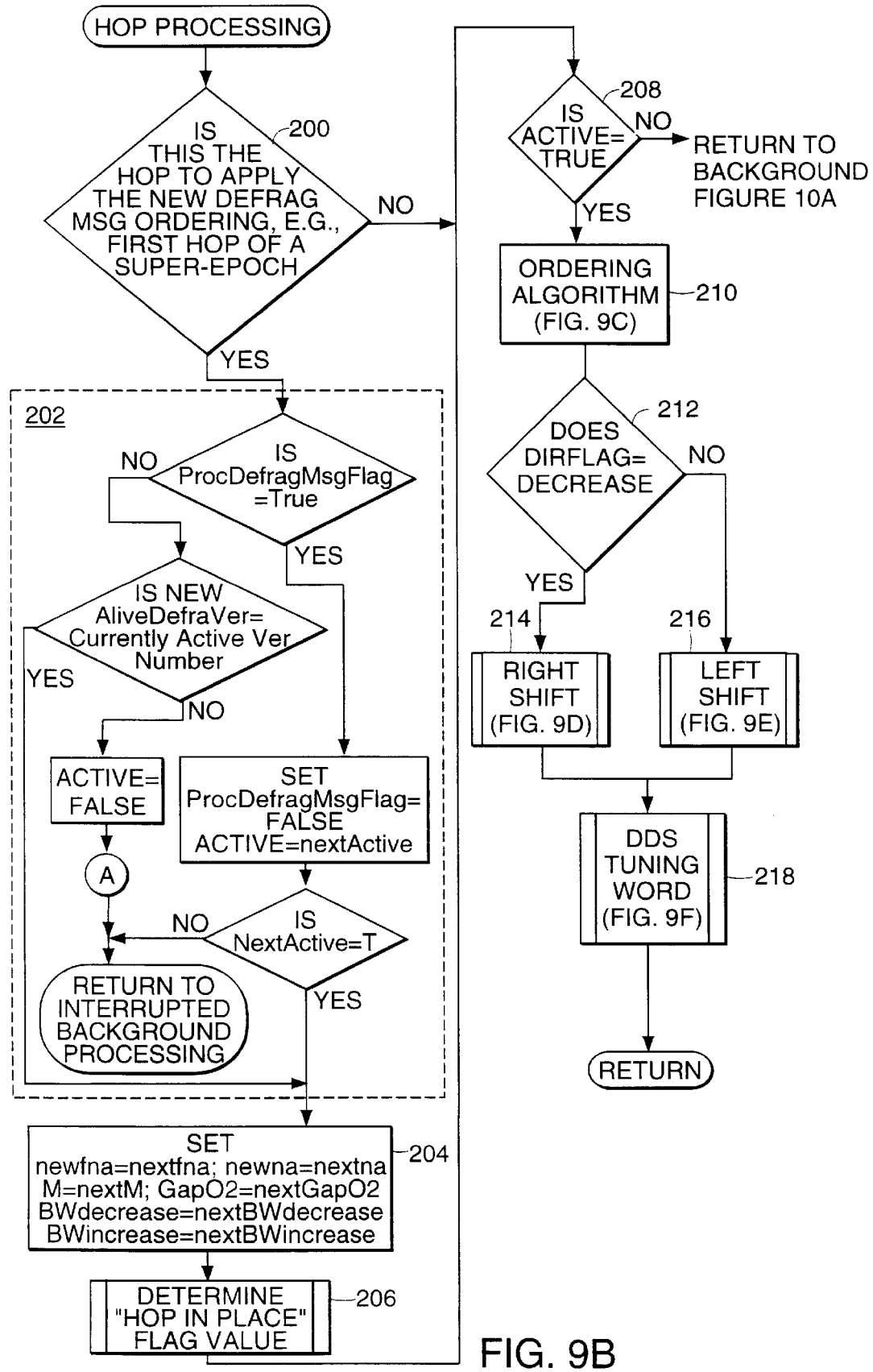

Referring now FIG. 9B, in Step 200, the processor determines whether this is the first hop of a super-epoch interval. If it is, the process proceeds to Step 202, as indicated. In Step 202, processing flags are initialized as indicated which will reflect the flow in FIGS. 9C–9F. The process proceeds to Step 204, as indicated. In Step 204, the process sets newfna to nextfna, newna to nexna, M to nextM; GapO2 to nextGapO2, BWdecrease to nextBWdecrease and BWincrease to nextBWincrease, as indicated.

Figure 9C:
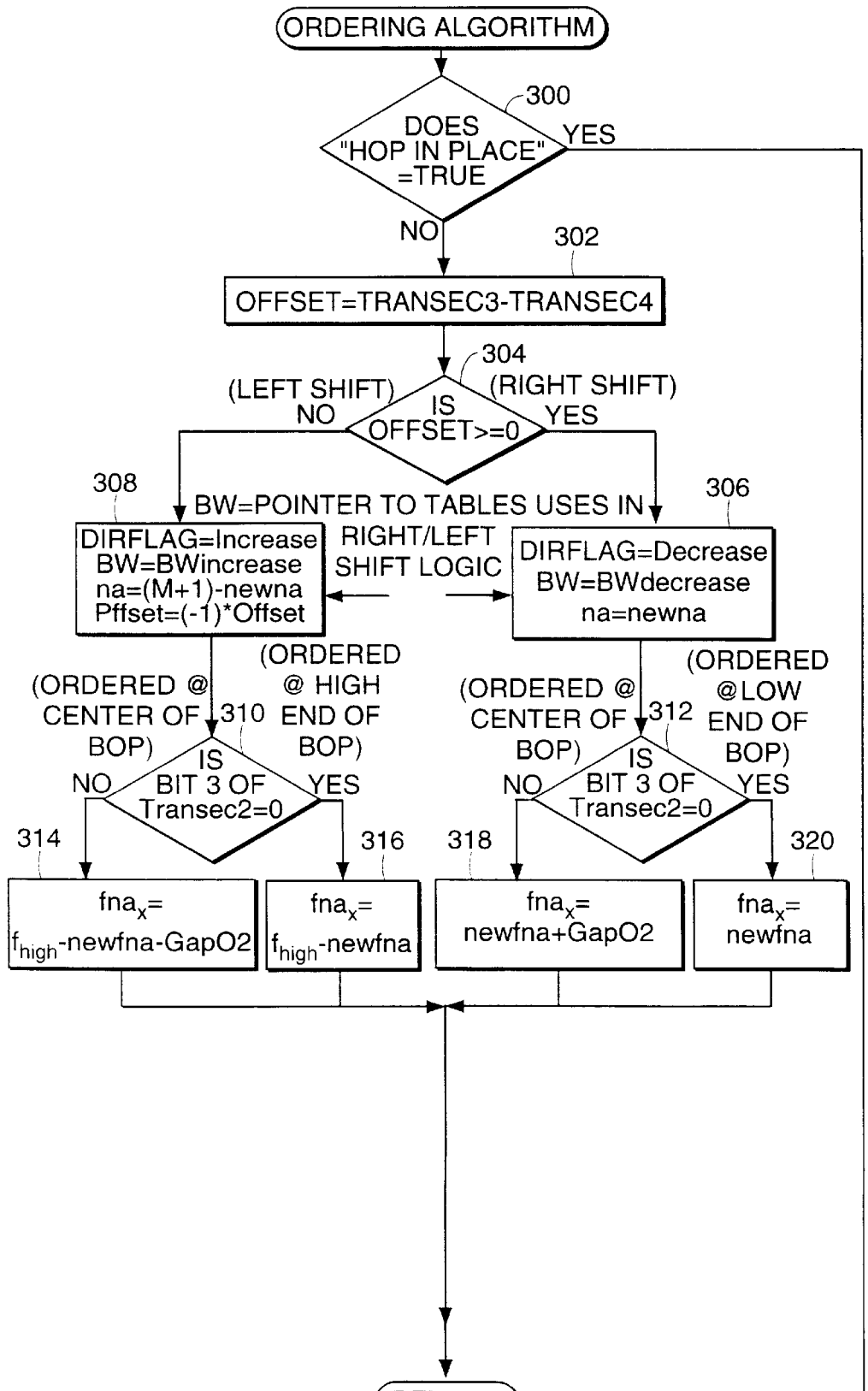

In Step 206, the processor 20 determines the condition of a hop-in-place flag. Hop-in-place is used to test the system. In Step 208, a test is made to determine the NTM will be active during the next super-epoch. If it is to be used, an ordering algorithm to be described in connection with FIG. 9C is performed in step 210. If it is not to be active, the process returns to the background processing in FIG. 9B.

In Step 212, a DIRFLAG (i.e., the sign of the difference of two consecutive TRANSEC words) is tested to determine whether a right or left frequency shift is to be performed. If the DIRFLAG is decreasing, then a right shift is indicated and the process proceeds to Step 214 to be described in connection with FIG. 9D. If the DIRFLAG is not decreasing, then a left shift is indicated and the process proceeds to Step 216 to be described in connection with FIG. 9E. In either case, the process proceeds to Step 218 where the processor converts the relative center frequency being computed into a tuning control word for the DDS 28, 38 as will be described in connection with FIG. 9F.

Referring now to FIG. 9C, in Step 300, a test is made of the hop-in-place flag; if set (i.e. True), the process returns to Step 212 (FIG. 9B). If not set, the process proceeds to Step 302. In Step 302, an OFFSET is determined where OFFSET is the TRANSEC WORD, as described above. Here, the two consecutive TRANSEC words, called Transec3 and Transec4, are subtracted to form the TRANSEC WORD or Offset.

In Step 304 a test is made of the sign of the difference. If the sign is positive, a right shift is indicated and the process proceeds to Step 306. If the sign is negative, a left shift is indicated and the process proceeds to Step 308. In Steps 306 and 308 the processes sets flags and parameters indicated in the boxes labeled 306 and 308. In Step 310 and 312 a decision is made whether the reference position is to be in the center of the BOP (Steps 314 and 318) or at the edges of the BOP (Steps 316 and 320) as described above in connection with FIGS. 4A, 5A, 6A and 7A. The process then returns to Step 212 in FIG. 9B.

Figure 9D:
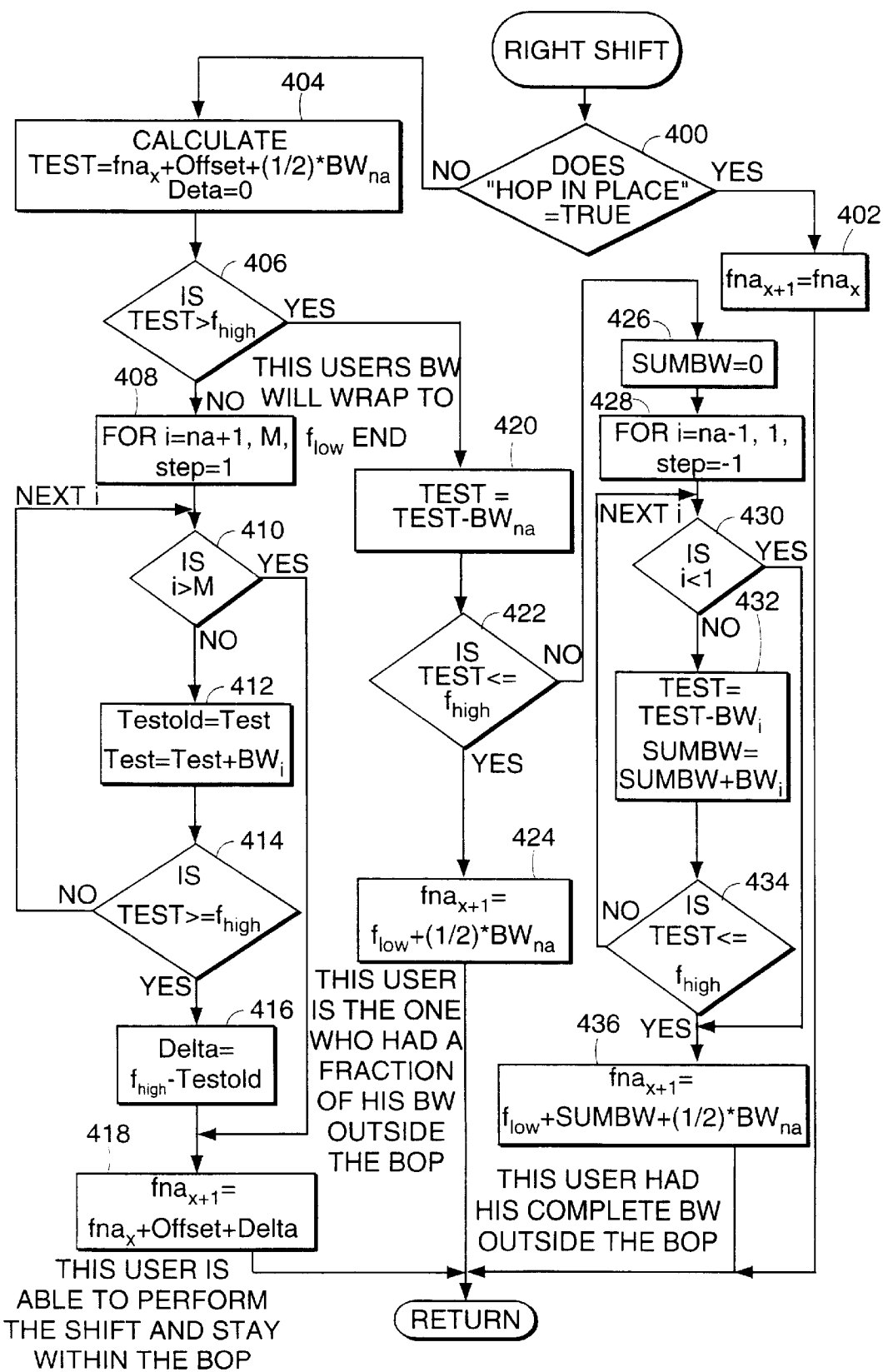

Referring now to FIG. 9D, in Step 400 another hop-in-place test is performed. If hop-in-place is true, step 402 is performed and the hop frequency remains fixed. If the hop-in-place is not true, the process proceeds to step 404. In Step 404, a parameter delta is cleared and a test parameter TEST is calculated, as indicated. In Step 406, the TEST parameter is tested to determine whether the TEST value exceed the $f_{high}$. If $f_{high}$ is not exceeded, Steps 408–418 are performed. If the value of TEST in Step 406 exceeds $f_{high}$, the TEST parameter is modified as indicated in Step 420. A test is made in Step 422 to determined if the user is partially in the BOP or totally outside the BOP. If partially in the BOP Step 424 is performed as indicated. If totally outside the BOP, Step 426–436 are performed as indicated. In each case, the process returns to Step 218 in FIG. 9B.

Figure 9E:
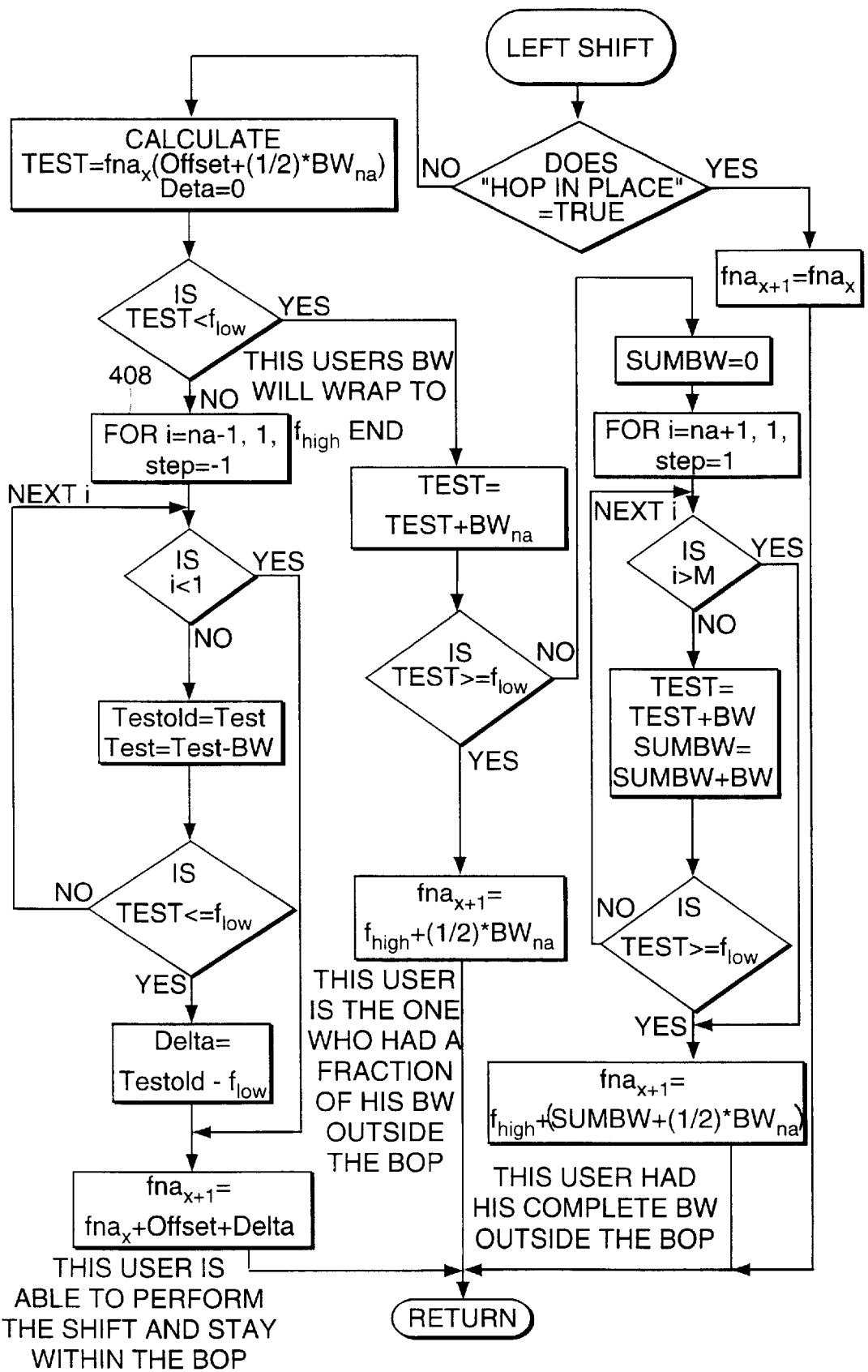

Referring to FIG. 9E, the process is shown for a left shift frequency condition. The process is similar to that described above in connection with FIG. 9D.

Figure 9F:
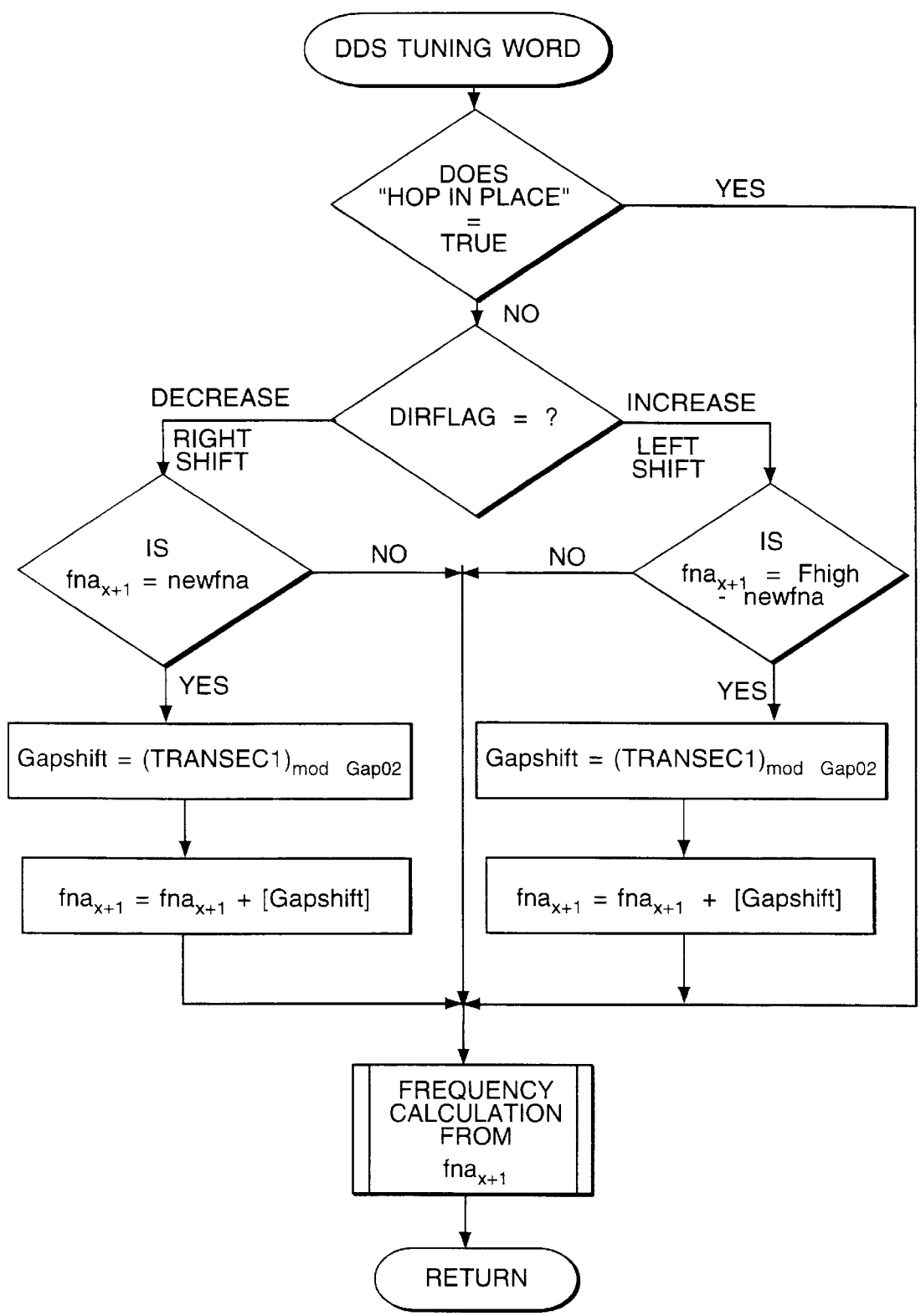

Referring now to FIG. 9F, the DDS tuning words are computed in accordance with the flow diagram shown.

Other embodiments are within the spirit and scope of the appended claims.

What is claimed is:

1. A spread spectrum radio frequency communication system comprising:

a plurality of transmitters adapted to operate at different carrier frequencies, such transmitters having initial preassigned relative carrier frequencies, such carrier frequencies changing in accordance with a common pseudo-random code and wherein each of the transmitters has a predetermined bandwidth and the carrier frequencies of the transmitters operate at frequencies arranged in accordance with the relative bandwidth of the transmitters.

2. A spread spectrum radio frequency communication system comprising:

a plurality of transmitters adapted to operate at different carrier frequencies, such transmitters having initial preassigned relative carrier frequencies, such carrier frequencies changing in accordance with a common pseudo-random code and wherein each of the transmitters has a predetermined bandwidth and the carrier frequencies of the transmitters operate at frequencies arranged in accordance with the relative bandwidth of the transmitters; and wherein transmitters having substantially equal bandwidth have carriers frequencies arranged in accordance with relative transmitter power.

3. A spread spectrum radio frequency communication system comprising:

a plurality of user slots disposed over a predetermined band of frequencies, each of a first portion of the user slots having transmitters adapted to operate at different carrier frequencies within the predetermined band of frequencies, the carrier frequencies of the users in the first portion thereof being changed in accordance with a common pseudo-random code, a second portion of the user slots includes transmitters having carrier frequencies randomly changing within such second portion of the slots in accordance with a code comprising the common pseudo-random code and a pseudo-random code unique to each one of the transmitters in the second portion thereof.

4. A spread spectrum radio frequency communication system, comprising:

a plurality of transmitters, each one being adapted to transmit information at a changeable carrier frequency centered about a predetermined transmitter bandwidth, the transmitters having different preassigned reference carrier frequencies, the carrier frequencies being preassigned in accordance with the transmitter bandwidth, the transmitter bandwidth of each of the transmitters being in a different region of a predetermined system band of frequencies;

a pseudo-random code generator for changing the reference carrier frequencies of the transmitters during each of a sequence of frequency hops in accordance with a common pseudo-random code, the bandwidth of each of the transmitters being in a different region of a predetermined band of frequencies during each of the frequency hops as the carrier frequencies are randomly changed.

5. A spread spectrum radio frequency communication system having a predetermined system bandwidth, such system comprising:

a plurality of transmitters, each one being adapted to transmit information at a changeable carrier frequency centered about a predetermined transmitter bandwidth, the transmitters having different preassigned initial reference carrier frequencies with each one of the transmitters transmitting the information in a frequency spectrum occupying a different portion of the predetermined system bandwidth;

a pseudo-random code generator for randomly shifting the preassigned initial reference carrier frequencies of the transmitters during each of a sequence of frequency hops by a randomly selected frequency increment, δ, such increment being selected in accordance with a common pseudo-random code;

a processor for determining whether the frequency spectrum of any of the transmitters will, after being shifted the randomly selected frequency increment, δ, fall outside of the predetermined system bandwidth, and if so, determining the portion, Δ, of the frequency spectrum remaining within the predetermined system bandwidth, the transmitters with shifted frequency spectra remaining fully within the predetermined system bandwidth having the carrier frequencies thereof shifted by the randomly selected frequency increment, δ, algebraically added to the portion, Δ, to shift the bandwidth of such transmitters to one end of the predetermined system bandwidth and the spectrum of the transmitter partially falling outside the predetermined system bandwidth being shifting to the other extreme of the predetermined system bandwidth, the bandwidth of the transmitters being maintained in different regions of a predetermined band of frequencies during each of the frequency hops as the carrier frequencies are randomly frequency shifted.

6. The system recited in claim 5 wherein the carrier frequencies are preassigned in accordance with the bandwidth of the transmitters, the bandwidth of each of the transmitters being in a different region of a predetermined band of frequencies.

7. The spread spectrum communication system recited in claim 6 wherein each of the transmitters has a predetermined bandwidth and the carrier frequencies of the transmitters operate at frequencies arranged in accordance with the relative bandwidth of the transmitters.

8. The spread spectrum communication system recited in claim 7 wherein transmitters having substantially equal bandwidth have carriers frequencies arranged in accordance with relative transmitter power.

9. A spread speftrum radio frequency communication system comprising a plurality of transmitters adapted to hop orthogonally in frequency over a predetermined band of frequencies and wherein each of the transmitters has a predetermined bandwidth and carrier frequencies of the transmitters operate at frequencies arranged in accordance with the relative bandwidth of the transmitters wherein such carrier frequencies change in accordance with a common pseudo-random code.

10. A spread spectrum radio frequency communication system comprising a plurality of transmitters adapted to hop orthogonally in frequency over a predetermined band of frequencies and wherein each of the transmitters has a predetermined bandwidth and carrier frequencies of the transmitters operate at frequencies arranged in accordance with the relative bandwidth of the transmitters; and wherein transmitters having substantially equal bandwidth have carriers frequencies arranged in accordance with relative transmitter power.

* * * * *